J. STRZYCZKOWSKI.
TEMPERATURE INDICATOR.
APPLICATION FILED APR. 16, 1918.
1,294,846.  Patented Feb. 18, 1919.
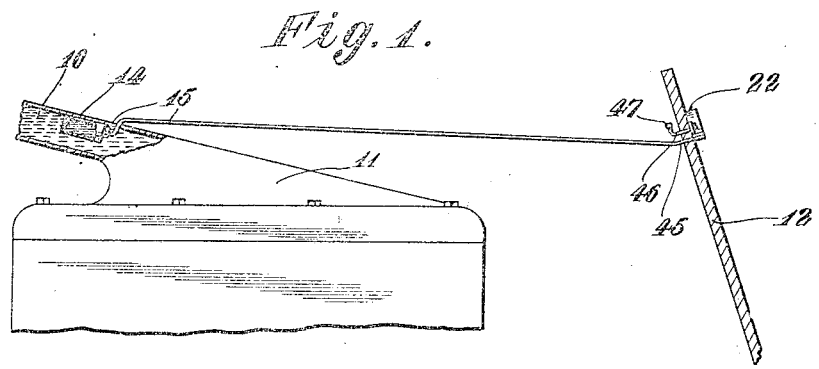
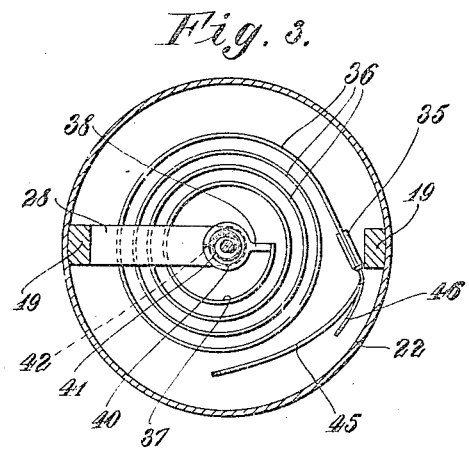
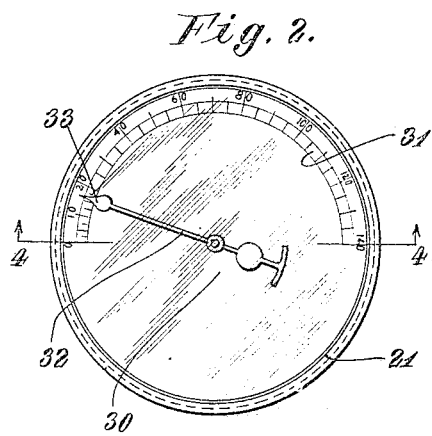
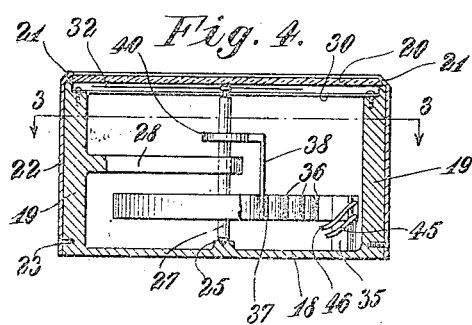
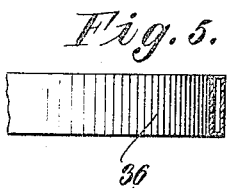
INVENTOR
Julian Strzyczkowski
BY Oscar Geier
his ATTORNEY.

UNITED STATES PATENT OFFICE.

JULIAN STRZYCZKOWSKI, OF NEW YORK, N. Y.

TEMPERATURE-INDICATOR.

1,294,846.

Specification of Letters Patent. Patented Feb. 18, 1919.

Application filed April 16, 1918. Serial No. 228,847.

*To all whom it may concern:*

Be it known that I, JULIAN STRZYCZKOW-SKI, a citizen of the United States, residing at New York, county of New York, and State of New York, have invented certain new and useful Improvements in Temperature-Indicators, of which the following is a specification.

This invention relates to improvements in devices for indicating the temperature of liquids and the like in the immediate vicinity.

The principal object of the invention is to provide means whereby the temperature of a body of water may be ascertained and correctly indicated, the particular object in view being to indicate the temperature of water as used in connection with automobile radiators, the indicating part of the device being located where it may be conveniently observed by the operator of the vehicle.

This object is attained by the novel construction and combination of parts hereafter described, and shown in the accompanying drawing, forming a material part of this disclosure, and in which:—

Figure 1 is a fragmentary, side elevational and sectional view, illustrating the manner of connecting and attaching the several parts.

Fig. 2 is an enlarged plan view of the indicator or mechanism casing.

Fig. 3 is a horizontal sectional view, taken on line 3—3 of Fig. 4.

Fig. 4 is a vertical sectional view taken on line 4—4 of Fig. 2, and

Fig. 5 is a fragmentary view, showing a section of one of the details employed.

In Fig. 1 of the drawings, a body of water 10, is contained within a casing 11, adjacent to the dash-board 12 of the vehicle, and engaged within the casing 11, so as to be surrounded by the water, is a closed cylinder 14, adapted to contain alcohol or like non-freezing liquids, which is expansible, due to changes in temperature.

Engaged with the cylinder 14, is a pipe 15, passing through the dashboard 12, so placed as to be readily seen by the operator of the vehicle. The indicator casing comprises a base 18, from opposite sides of which rise the standards 19 supporting a transparent disk or plate 20, preferably made of glass, and held in position upon the standards by the inturned edges 21 of a casing 22, forming a cylinder, the casing being secured to the standards by screws 23. Raised centrally from the base 18 is a boss 25, formed with a pivot bearing adapted to receive the lower end of a spindle 27, which is further supported by a bracket arm 28, formed with one of the standards, the spindle being rotatably journaled in a disk 30, upon which are marginal graduations 31, indicating in the manner of a thermometer, upon a scale, the degrees of temperature.

Secured to the upper end of the spindle 27 is an index hand 32, the pointer 33 of which acts in combination with the graduations 31 in an obvious manner.

Secured to a post 35, fastened to, or formed with, the base 18, is the outer end of a hollow spirally wound spring, having convolutions 36, its inner end 37 being fastened to an arm 38, depending from a disk 40, having a concave upper surface and arranged within the disk 40 is a reversely coiled, finely wound, thin spring 41, the outer end 42 of which is engaged with the disk, while the inner end is attached to the spindle 27, the tension and action of the spring 41, being such as to return the pointer 33 to its initial position, when the hollow spring 36 is not distorted by the pressure of the liquid held therein.

The hollow spring 36 is in direct connection with the pipe 15, through the hollow tubular element 45, another connection 46, upturned at its outer end and normally covered by a cap 47, providing means by which the tube may be originally filled, or, should the contents shrink by evaporation or otherwise, may be refilled at any desired time.

Obviously, when the liquid surrounding the cylinder 14 changes its temperature beyond a given point, it will force the liquid contained in the cylinder through the pipe 15, and then into the hollow spring 36, tending to rotate the pointer 33 in a manner which will be well understood, and conversely, should the liquid surrounding the cylinder 14 fall below a certain degree of heat, a reverse effect will take place.

From the foregoing it will be clearly evident that when the temperature changes to any material extent within the cylinder 14, the same will cause the hand of the index 32 to become actuated, while the amount of change can be readily read from the graduations 31.

Having thus described my invention what

I claim as new and desire to secure by Letters Patent, is:—

In a temperature indicator, the combination with a base plate, a pair of standards extending on opposite sides thereof, a hollow cylindrical casing, surrounding said standards and engaged therewith, and a transparent cover held in engagement by said casing, of a vertical spindle rotatably mounted within said casing, an index hand turned by said spindle, a dial plate below said cover, over which said index hand operates, a hollow spiral spring affixed to one of said standards at its outer convolution, means for initially filling said spring, a reservoir located in the liquid whose temperature it is desired to ascertain, connections between said reservoir and said hollow spring, a disk freely mounted on said spindle, an arm extending downward from said disk, and rigidly engaged with inner convolution of said hollow spring, and a counterbalancing spring having its outer convolution engaged rigidly within the said disk, and its inner end affixed to said spindle, so that as said hollow spring is caused to be actuated by change of temperature in the fluid contained therein, the effect will be resiliently transmitted to said spindle.

In testimony whereof I have affixed my signature.

JULIAN STRZYCZKOWSKI.